United States Patent
Boyer et al.

(10) Patent No.: US 12,536,246 B2
(45) Date of Patent: Jan. 27, 2026

(54) DECOMPOSING MATRICES FOR PROCESSING AT A PROCESSOR-IN-MEMORY

(71) Applicant: ADVANCED MICRO DEVICES, INC., Santa Clara, CA (US)

(72) Inventors: Michael W. Boyer, Redmond, WA (US); Ashish Gondimalla, Lafayette, IN (US); Bradford M. Beckmann, Kirkland, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 1123 days.

(21) Appl. No.: 17/490,037

(22) Filed: Sep. 30, 2021

(65) Prior Publication Data
US 2023/0102296 A1 Mar. 30, 2023

(51) Int. Cl.
*G06F 17/16* (2006.01)
*G06F 15/78* (2006.01)

(52) U.S. Cl.
CPC .......... *G06F 17/16* (2013.01); *G06F 15/7821* (2013.01)

(58) Field of Classification Search
CPC .... G06F 7/78; G06F 9/30036; G06F 9/30038; G06F 12/0207; G06F 2207/729; G06F 17/16; G06F 15/7821
See application file for complete search history.

(56) References Cited

U.S. PATENT DOCUMENTS

2023/0049323 A1* 2/2023 Li .................. G06N 20/00

FOREIGN PATENT DOCUMENTS

KR 101400577 B1 * 6/2014 ............. G06F 17/16

OTHER PUBLICATIONS

Harris D.M. & Harris S.L. Digital Design and Compute Architecture [1st Edition, Morgan Kaufmann]. Retrieved from the Internet: <URL:https://allbooksfordownloading.wordpress.com/wp-content/uploads/2017/01/digital-design-and-computer-architecture-by-david-and-sarah-harris.pdf> (Year: 2007).*
Zhao et al. A Novel Variable-Blocking Representation for Efficient Sparse Matrix-Vector Multiply on GPUs. Retrieved from the Internet: <URL:https://sc16.supercomputing.org/sc-archive/tech_poster/poster_files/post243s2-file3.pdf> (Year: 2016).*

(Continued)

*Primary Examiner* — Matthew D Sandifer

(57) ABSTRACT

A processing unit decomposes a matrix for partial processing at a processor-in-memory (PIM) device. The processing unit receives a matrix to be used as an operand in an arithmetic operation (e.g., a matrix multiplication operation). In response, the processing unit decomposes the matrix into two component matrices: a sparse component matrix and a dense component matrix. The processing unit itself performs the arithmetic operation with the dense component matrix, but sends the sparse component matrix to the PIM device for execution of the arithmetic operation. The processing unit thereby offloads at least some of the processing overhead to the PIM device, improving overall efficiency of the processing system.

20 Claims, 5 Drawing Sheets

(56) References Cited

OTHER PUBLICATIONS

Liu et al. Processing-in-Memory for Energy-Efficient Neural Network Training: A Heterogeneous Approach [2018 51st Annual IEEE/ACM International Symposium on Microarchitecture]. Retrieved from the Internet: <URL:https://ieeexplore.IEEE.org/document/8574576/authors#authors> (Year: 2018).*

Richard W. Vuduc and Hyun-Jin Moon. 2005. "Fast sparse matrix-vector multiplication by exploiting variable block structure." (HPCC'05). DOI:https://doi.org/10.1007/11557654_91.

Zhou et al. "A novel variable blocking representation for efficient sparse matrix-vector multiply on GPUs." 2016.

* cited by examiner

DECOMPOSING MATRICES FOR PROCESSING AT A PROCESSOR-IN-MEMORY

BACKGROUND

Matrix multiplication is an important operation for many scientific and machine-learning applications. To support efficient matrix multiplication, some processing systems employ specialized hardware, such as a graphics processing unit (GPU). The GPU divides the matrix multiplication operation into multiple sub-operations that are divided among processing elements, such as a set of single instruction, multiple data (SIMD) processing elements. However, in many cases, one or more of the matrices to be multiplied is a relatively sparse matrix—that is, includes a high number of elements having the value zero. Unlike dense matrices, sparse matrices are irregular which can lead to load imbalance in GPUs and in processing elements having GPU-like architectures. To address this issue, some GPUs adopt matrix representations and multiplication algorithms to work well with a SIMD architecture. However, in many cases, these representations and algorithms do not work well with more modern GPU and processor architectures.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate techniques for decomposing, at a processing unit, a matrix for partial processing at a processor-in-memory (PIM) device. The processing unit receives a matrix to be used as an operand in an arithmetic operation (e.g., a matrix multiplication operation). In response, the processing unit decomposes the matrix into two component matrices: a sparse component matrix and a dense component matrix. The processing unit itself performs the arithmetic operation with the dense component matrix, but sends the sparse component matrix to the PIM device for execution of the arithmetic operation. The processing unit thereby offloads at least some of the processing overhead to the PIM device, improving overall efficiency of the processing system.

To illustrate, some GPU architectures include dedicated hardware to perform matrix multiplication operations. However, the dedicated hardware is typically more efficient when performing multiplications with dense matrices, and less efficient when performing multiplications with sparse matrices. Further, because matrix multiplication is a distributive operation, the multiplication is able to be properly executed using component matrices of the original operand matrices. Accordingly, using the techniques described herein, an operand matrix for a matrix multiplication is decomposed into a dense matrix and a sparse matrix. The GPU performs the multiplication operation for the dense matrix and a PIM device performs the multiplication operation for the sparse matrix. Either the GPU or PIM device then combines the results of the multiplication operations to determine the final multiplication result. Thus, the multiplication operation is partially performed at the GPU, using the dense matrix and using the dedicated hardware that performs dense multiplication operations efficiently, and partially at the PIM device using the sparse matrix. The overall efficiency of the matrix multiplication operation is thereby improved.

Figure 1:
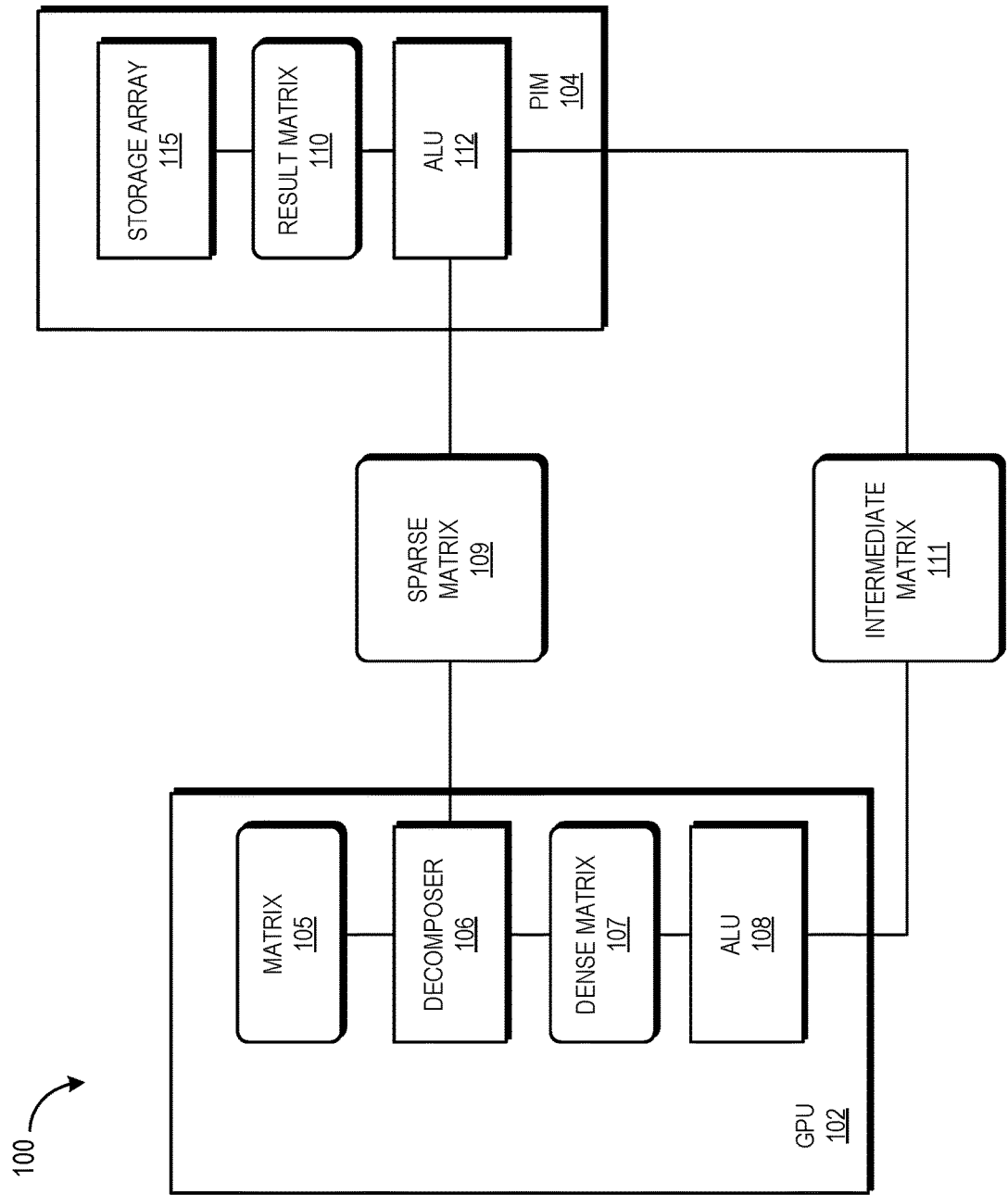
FIG. 1 is a block diagram of a processing system that decomposes a matrix for partial processing at a processor-in-memory (PIM) device in accordance with some embodiments.

FIG. 1 illustrates a block diagram of a processing system 100 in accordance with some embodiments. The processing system 100 is generally configured to execute sets of instructions (e.g., programs) or commands (e.g., draw commands) to carry out tasks on behalf of an electronic device. Accordingly, in different embodiments, the processing system 100 is incorporated into one of a variety of electronic devices, such as a desktop computer, laptop computer, server, smartphone, tablet, game console, and the like. To support execution of instructions, the processing system 100 includes a GPU 102 and a PIM device 104. In some embodiments, the processing system 100 includes additional processing units (e.g., one or more central processing units (CPUs)), memory devices, or other supporting devices (e.g., one or more input/output (I/O) controllers), and the like, or any combination thereof.

The GPU 102 is a processing unit generally configured to perform specified operations in response to received commands, such as commands received from a CPU. Examples of the types of operations performed by the GPU 102 include graphics operations (e.g., execution of draw commands and other graphics commands), vector operations, matrix operations, operations associated with machine learning, neural networks, artificial intelligence, and the like, or any combination thereof. In other embodiments, the GPU 102 is a different type of processing unit or processor, such as a parallel processor, a single instruction multiple data (SIMD) architecture processor, a single instruction multiple thread (SIMT) architecture processor, or another processor for performing tasks such as graphics, machine intelligence or compute operation tasks.

The PIM device 104 is a memory device that is configured to both store data on behalf of the GPU 102 and to perform relatively simple processing operations, such as arithmetic operations. Accordingly, in different embodiments, the PIM device 104 is a computational random-access memory (C-RAM) device or intelligent RAM (I-RAM) device including both random-access memory and processing elements in a common integrated circuit. In other embodiments, the GPU 102 and the PIM device 104 are configured in a stacked-die arrangement, wherein the GPU 102 and the PIM device 104 are integrated into separate dies. In some embodiments the dies are arranged in a three-dimensional (3D) vertical stack. In other embodiments, the PIM device 104 includes both a logic die and a set of memory dies, with the set of memory dies stack above the logic die in a 3D stack, and wherein the logic die performs the processing functions described further herein. In still other embodiments, the PIM device 104 includes both a logic die and a set of memory dies, and one or more of the memory dies performs the processing functions described further herein. The PIM device 104 is connected to the die of the GPU 102 via an interposer or other connector, and the dies of the PIM device 104 and the GPU 102 are integrated in the same integrated circuit package.

To support storage of data, the PIM device 104 includes a storage array 115. In some embodiments, the storage array 115 is an array of RAM bit cells, and the PIM 104 is generally configured to respond to memory access requests (e.g., read requests and write requests) issued by the GPU 102 or other processing unit by storing or retrieving at the storage array 115. To support processing of data, the PIM device 104 includes one or more processing modules, such as an arithmetic logic unit (ALU) 112, configured to execute specified processing operations on data stored at, or to be stored at, the storage array 115.

In some embodiments, the processing modules of the PIM 104 are configured to execute discrete processing tasks, wherein the processing tasks are indicated by commands or other control signaling issued by the GPU 102 or other processing unit, and the processing modules are not able to carry out more general processing tasks such as those carried out by a CPU, by the GPU 102, or other processing unit. For example, the ALU 112 is configured to perform arithmetic operations, such as matrix multiplication, on received matrices, wherein the arithmetic operations are based on commands issued by the GPU 102. However, the ALU 112 is not able to carry out all of the operations of the GPU 102, or is not able to execute similar operations as efficiently as the GPU 102. To illustrate, the GPU 102 includes an ALU 108 that is configured to perform arithmetic operations, including matrix arithmetic operations such as matrix multiplication. In some embodiments, the ALU 108 is configured differently than the ALU 112, such that the ALU 108 is able to execute matrix arithmetic operations more efficiently on dense matrices (that is, matrices having a relatively high number of non-zero value elements) than the ALU 112 is able to execute the same operation.

To leverage the different processing capabilities of the ALU 108 and the ALU 112, the GPU 102 includes a decomposer 106 that is generally configured to decompose operand matrices (e.g., operand matrix 105) into component matrices (e.g., matrices 107 and 109), wherein the different component matrices are used as operands in arithmetic operations at the ALU 108 and the ALU 112, respectively. In some embodiments, the decomposer 106 is implemented in software, such as in a device driver that controls operations at the GPU 102 on behalf of an operating system or application program that is executing at a CPU. In other embodiments, the decomposer 106 is a dedicated hardware module including circuitry that performs the decomposition operations described further herein.

In operation, the decomposer 106 receives a matrix 105 that is to be used in a matrix arithmetic operation. For purposes of description, it is assumed that the matrix arithmetic operation is a matrix multiplication operation. However, it will be appreciated that in other embodiments the matrix arithmetic operation is a different type of arithmetic operation. In response to receiving the matrix 105, the decomposer 106 decomposes the matrix 105 into two component matrices: a dense matrix 107, having a relatively high number of non-zero value elements (and therefore a relatively low number of zero-value elements) and a sparse matrix 109, having a relatively low number of non-zero value elements). The decomposer 106 provides the dense matrix 107 to the ALU 108 and provides the sparse matrix 109 to the ALU 112. The ALU 108 performs the matrix multiplication operation using the dense matrix 107 to generate the intermediate matrix 111, representing a part of the matrix multiplication result. The ALU 112 performs the matrix multiplication operation using the sparse matrix 109 to generate an intermediate result, then combines that intermediate result with the intermediate matrix 111 to generate the result matrix 110. The ALU 112 stores the result matrix 110 at the storage array 115. In other embodiments, the result matrix 110 is generated by ALU 108 and is then transferred to the PIM 104 for storage at the storage array 115.

For example, in some embodiments, the GPU 102 is to multiply two matrices, designated matrix A and matrix B, to generate a product designated matrix C. Matrix A is the sum of a dense matrix $A_{dense}$ and a sparse matrix $A_{sparse}$, as indicated by the following formula:

$$A = A_{dense} + A_{sparse}$$

In some embodiments, because of the relative complexity of multiplying dense matrices, Matrix B is left in its original form. By multiplying the corresponding elements of the dense and sparse matrices of A with the matrix B and adding the results, the ALUs 108 and 112 together generate the product matrix C as the result matrix 110. Further, the dense matrix multiplication (that is, the multiplication using $A_{dense}$) is performed at the ALU 108, which is more efficient at executing matrix multiplication using dense matrices. The sparse matrix multiplication (that is, the multiplication using $A_{sparse}$) is performed at the ALU 112, which executes the multiplication with less overhead than the GPU 102. Thus, the overall efficiency of the matrix multiplication operation is enhanced.

Figure 2:
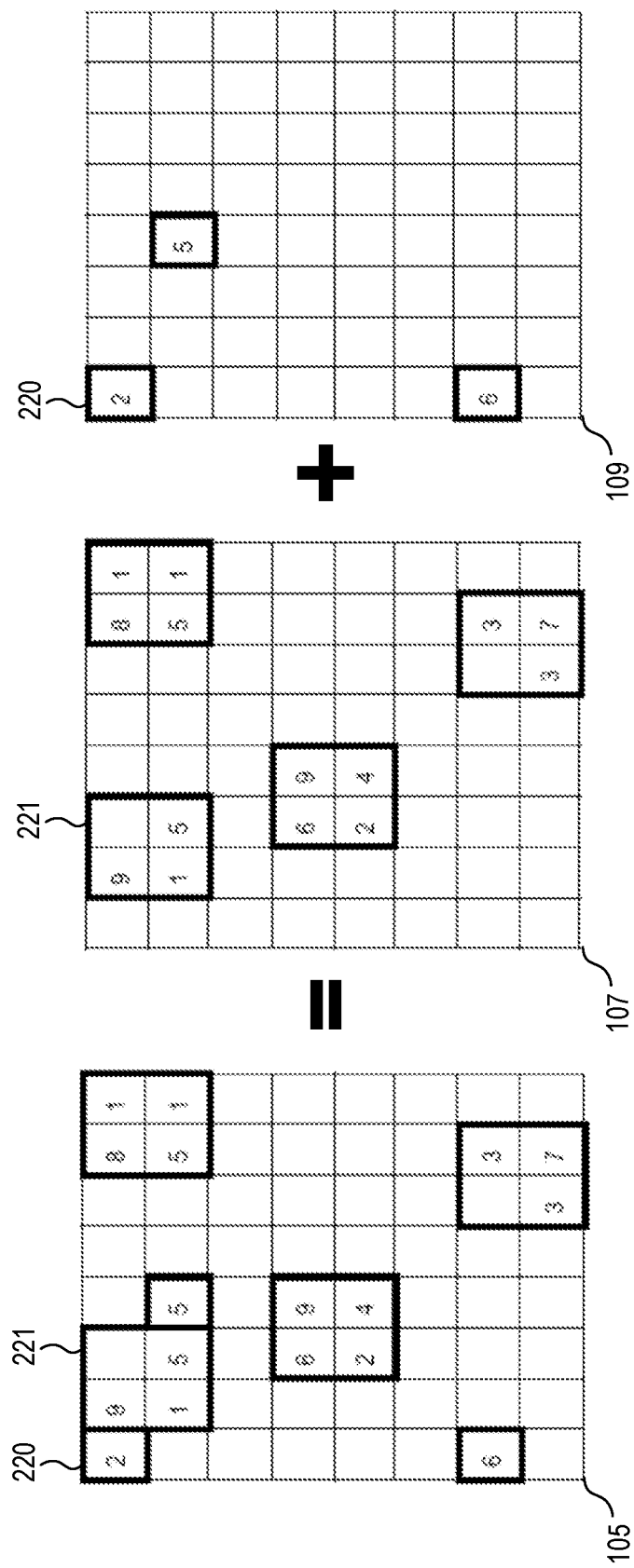
FIG. 2 is a diagram illustrating an example decomposition of a matrix into a sparse matrix and a dense matrix for processing in accordance with some embodiments.

FIG. 2 illustrates an example of the decomposer 106 decomposing the matrix 105 into component matrices 107 and 109 in accordance with some embodiments. In the example of FIG. 2, the matrix 105 includes a plurality of elements, wherein each element is illustrated with a corresponding box. Each element either has a non-zero value, with the value being indicated in the corresponding box, or a zero value, with zero-value elements illustrated with an empty box.

To decompose the matrix 105, the decomposer 106 selects blocks of elements (e.g., blocks 220, 221) from the matrix 105 and assigns each block to one of the dense matrix 107 and the sparse matrix 109. If a given element is not assigned to a particular component matrix, the corresponding matrix of that element is assigned a value of zero. Thus, in the depicted example, block 220 includes element (0,0) of the matrix 105, with element (0,0) having a value of 2. Block 220 is assigned to the sparse matrix 109 and therefore element (0,0) of dense matrix 107 is assigned a value of zero.

In some embodiments, to decompose the matrix 105 into the dense matrix 107 and the sparse matrix 109, the processing unit divides the matrix 105 into a set of blocks using a fixed block size. The processing unit then applies a sliding window to the set of blocks, selecting the block in each window having the highest number of non-zero-value elements for inclusion in the dense matrix 107. In some embodiments, the processing unit iteratively applies this process, periodically changing the block size or other parameters (e.g., a fill ratio indicating a threshold number of non-zero elements required for a block to be considered) until a ratio of non-zero values in the dense component matrix 107 to non-zero values in the sparse component matrix 109 matches a specified threshold, such as a threshold based on the processing unit-to-PIM compute ratio parameter. In some embodiments the compute ratio parameter ratio is set by estimating execution time for a workload on the GPU 102 and the PIM device 104 based on an application's compute-to-byte ratio. The compute-to-byte ratio is a value indicating the ratio of the number of compute operations associated with an application to the number of memory operations associated with the application. By basing the ratio of non-zero values in the matrices, the processing unit thus ensures a good distribution of elements between the sparse matrix 109 and the dense matrix 107, enhancing the overall efficiency of the ensuing mathematical operation.

Figure 3:
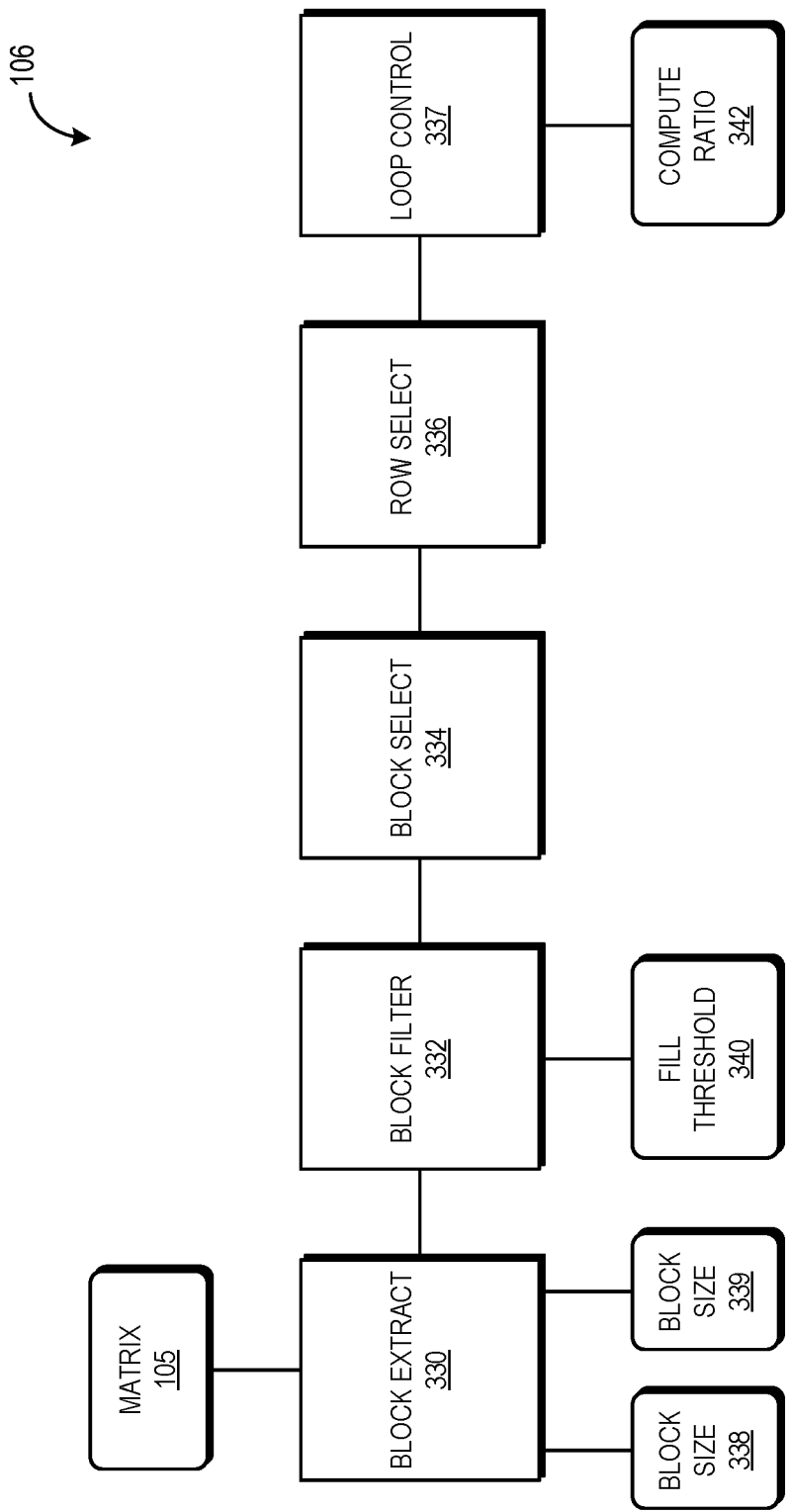
FIG. 3 is a block diagram of a matrix decomposer of the processing system of FIG. 1 in accordance with some embodiments.

FIG. 3 is a block diagram of an example of the decomposer 106 in accordance with some embodiments. As noted above, in some embodiments, the decomposer 106 is implemented in software, and thus the different blocks illustrated at FIG. 3 represent different sets of operations implemented by the software. In other embodiments, the decomposer 106 is implemented in hardware, and the different blocks illustrated at FIG. 3 represent different modules and circuits that collectively implement the different operations described herein.

In the illustrated embodiment, the decomposer 106 includes a block extraction module 330 that is generally configured to extract blocks of values from the matrix 105 using a selected fixed block size, such as block size 338 and block size 339. Examples of block sizes include 2×2 blocks, 4×4 blocks, 1×2 blocks and the like. In some embodiments, the block sizes are set based on the hardware design of the ALU 108, so that the ALU 108 can execute arithmetic operations using the dense matrix 107 relatively efficiently.

A block filter 332 is configured to filter the extracted blocks based on a fill threshold 340 that indicates a fraction of non-zero values. For example, in some embodiments, the block filter 332 removes, from the set of extracted blocks, any blocks having a fraction of non-zero values that is less than a threshold. The block filter 332 thus ensures that blocks having a relatively low number of non-zero values are not considered for inclusion in the dense matrix 107.

Figure 4:
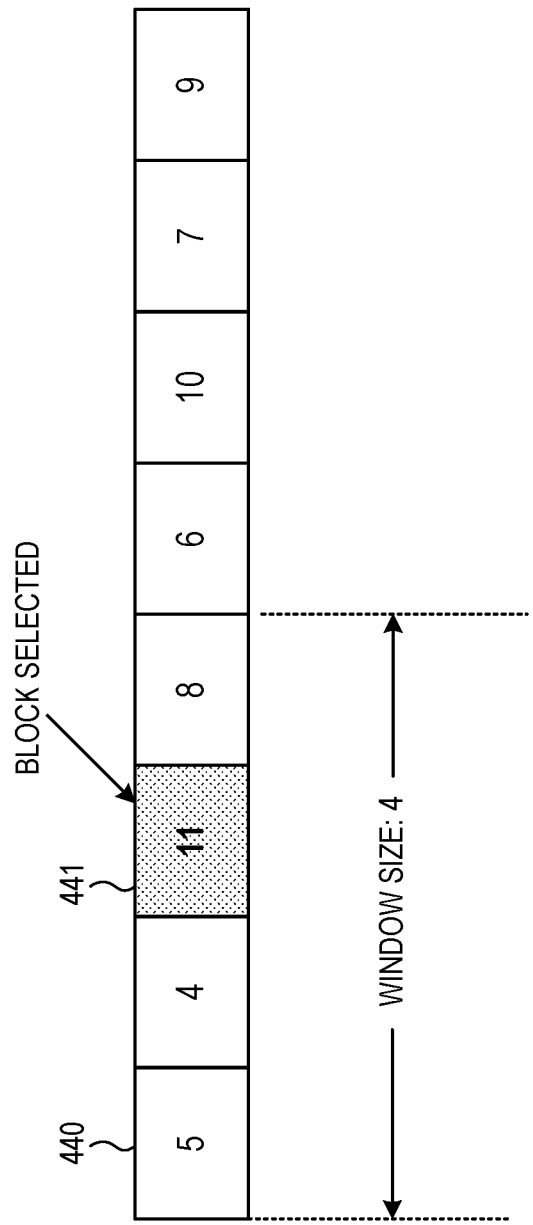
FIG. 4 is a block diagram illustrating an example selection of a matrix block for a dense matrix in accordance with some embodiments.

The block select module 334 is configured to apply a sliding window of a specified size to the filtered set of blocks generated by the block filter 332. For each window, the block select module 334 selects the block having the highest number of non-zero values and includes the selected block in the dense matrix 107. An example of this operation is illustrated at FIG. 4 in accordance with some embodiments. In the depicted example a matrix has been divided into blocks (e.g., blocks 440, 441) by the block extraction module 330 and those blocks have been filtered by the block filter 332 based on the fill threshold 340. The block select module 334 slides a window, having a size of four blocks, along the filtered blocks and determines for each window the block having the highest number of non-zero values. In the example of FIG. 4, the number of non-zero values for each block are indicated by the number in the corresponding box. Thus, the block select module 334 selects the block 441, because that block has the highest number of non-zero values (eleven non-zero values) and includes the block 441 in the dense matrix 107. The window is then moved to the end position of the selected block so that the next block does not overlap with the previous block. The row select module 336 then selects the next row using the same heuristic (e.g., selects the next non-overlapping row). The block select module 334 then repeats block selection for the next row, and so on until the window has been applied to all of the filtered blocks provided by the block filter 332.

The loop control module 337 is configured to control the number of iterations of the above operations, and to control the block size and fill threshold 340 for each iteration. For example, in some embodiments, after the block select module 334 has selected a set of blocks from the matrix 105, the loop control module 337 determines a ratio of non-zero values in the dense component matrix 107 to non-zero values in the sparse component matrix 109. This ratio is referred to for purposes of description as the non-zero ratio, or NZR. The loop control module 337 determines if the NZR matches a specified compute ratio threshold 342, wherein the compute ratio threshold 342 is based on the processing unit-to-PIM compute ratio parameter. If the NZR matches or exceeds the compute ratio threshold 342, the decomposition of the matrix 105 is complete and the decomposer 106 provides the dense matrix 107 to the ALU 108 and provides the sparse matrix 109 to the ALU 112 at the PIM device 104.

If the loop control module 337 determines that the NZR does not match or exceed the compute ratio 342, the loop control module 337 adjusts one or both of the block size used by the block extraction module 330 and the fill threshold 340 used by the block filter 332. The decomposer 106 then repeats the extraction, filter, and selection operations described above using the adjusted values. In some embodiments, the decomposer 106 has specified minimum or maximum values for the block size and for the fill threshold 340. In response to determining that the NZR does not match or exceed the compute ratio 342 after using these minimum or maximum values, the decomposer 106 uses another block selection algorithm to complete the decomposition, such as an unaligned block compressed sparse row (UBCSR) process.

Figure 5:
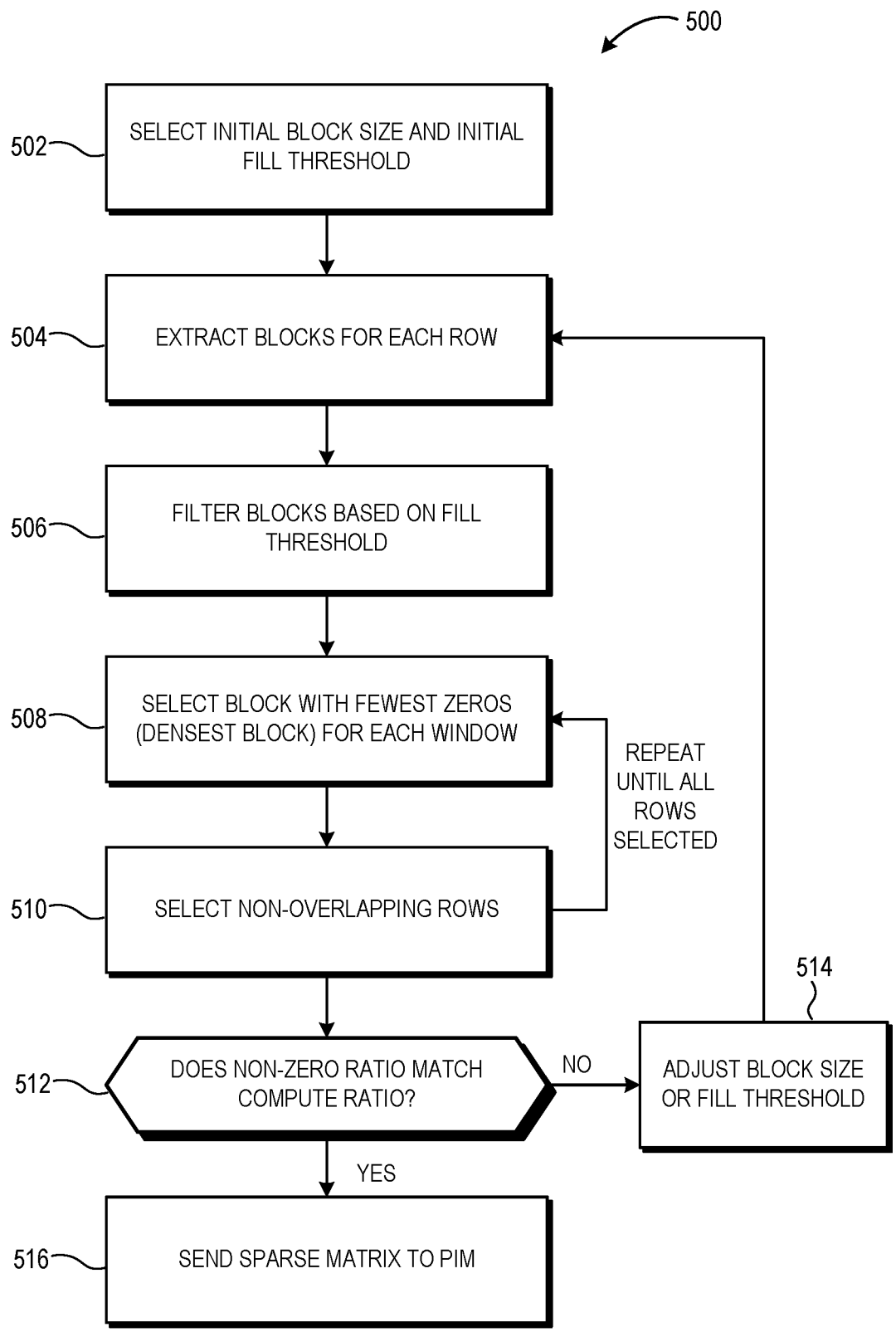
FIG. 5 is a flow diagram of a method of decomposing a matrix for partial processing at a PIM device in accordance with some embodiments.

FIG. 5 illustrates a flow diagram of a method 500 of decomposing a matrix into component matrices for separate processing at a processing unit and a PIM device in accordance with some embodiments. The method 500 is described with respect to an example implementation at the decomposer 106. At block 502, the loop control module 337 selects an initial block size and an initial fill threshold 340. At block 504 the block extraction module 330 extracts blocks from the matrix 105 using the initial block size.

At block 506, the block filter 332 filters blocks that do not match the initial fill threshold 340, thereby generating a filtered set of blocks. At block 508, the block selection module 334 slides a window along an initial row of the matrix. For each window, the block selection module 334 selects the block having the fewest zero-value elements—that is, the densest block, and includes the block in the dense matrix 107. Non-selected blocks are included in the sparse matrix 109. The block selection module 334 then moves the window to the end of the selected block to ensure no overlap, and repeats the process, until the window has reached the end of the row. The method flow then moves to block 510 and the row selection module 336 selects the next row of the matrix 105 having blocks that do not overlap with the previous row. The method returns to block 508, and the block selection module 334 selects blocks for the selected row as described above.

The block selection module 334 and row selection module 336 repeat the operations of blocks 508 and 510, respectively, until the end of the matrix 105 is reached. The method flow then proceeds to block 512 and the loop control module 337 determines if the NZR matches or exceeds the compute ratio 342. If not, the method flow proceeds to block 514 and the loop control module 337 adjusts one or both of the block size and the fill threshold 340. The method flow returns to block 504 and the block extraction, filtering, and selection operations are repeated with the adjusted block size or fill threshold (or both). When, at block 512, the NZR matches or exceeds the compute ratio 342, the decomposition of the matrix 105 is completed. The method flow proceeds to block 516 and the decomposer 106 sends the dense matrix 107 to the ALU 108 for execution of the corresponding arithmetic operation and sends the sparse matrix 109 to the ALU 112 at the PIM 104 for execution of the corresponding arithmetic operation.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
in response to receiving a matrix arithmetic command:
decomposing at a processing unit a first matrix into a second matrix and a third matrix, the second matrix being denser than the third matrix;
sending the third matrix to a processor-in-memory (PIM) device for execution of a first arithmetic operation; and
responsive to the second matrix being denser than the third matrix, assigning the second matrix for execution of a second arithmetic operation by the processing unit.

2. The method of claim 1, further comprising:
executing the second arithmetic operation at the processing unit based on the second matrix.

3. The method of claim 2, further comprising:
sending a result of the second arithmetic operation to the PIM device for execution of a third arithmetic operation, the third arithmetic operation using a result of the first arithmetic operation.

4. The method of claim 1, wherein decomposing the first matrix comprises:
extracting a first plurality of blocks from the first matrix based on a first fixed block size.

5. The method of claim 4, wherein decomposing the first matrix comprises:
selecting a first subset of the first plurality of blocks based on a corresponding number of zero-value elements of each of the first plurality of blocks.

6. The method of claim 5, wherein selecting the first subset comprises selecting a block having the most zero-value elements of the first plurality of blocks.

7. The method of claim 5, wherein decomposing the first matrix comprises:
prior to selecting the first subset, filtering the first plurality of blocks based on a fill threshold indicating a specified number of zero-value elements for a block.

8. The method of claim 5, wherein decomposing the first matrix comprises:
including the first subset in the third matrix.

9. The method of claim 8, wherein decomposing the first matrix comprises:
determining if a sparseness ratio of non-zero value elements to zero-value elements of the third matrix meets a threshold, the threshold based a compute ratio between the processing unit and the PIM device; and
in response to the sparseness ratio being below the threshold, extracting a second plurality of blocks from the first matrix based on a second fixed block size, the second fixed block size different from the first fixed block size.

10. A processing unit, comprising:
decomposition circuitry configured to, in response to receiving a matrix arithmetic command:
decompose a first matrix into a second matrix and a third matrix, the second matrix being denser than the third matrix;
send the third matrix to a processor-in-memory (PIM) device for execution of a first arithmetic operation; and
responsive to the second matrix being denser than the third matrix, assign the second matrix for execution of a second arithmetic operation by a logic unit of the processing unit.

11. The processing unit of claim 10, wherein the logic unit is an arithmetic logic unit configured to execute the second arithmetic operation at the processing unit based on the second matrix.

12. The processing unit of claim 11, wherein the processing unit is configured to:

send a result of the second arithmetic operation to the PIM device for execution of a third arithmetic operation, the third arithmetic operation using a result of the first arithmetic operation.

13. The processing unit of claim 10, wherein the decomposition circuitry is to decompose the first matrix by:
extracting a first plurality of blocks from the first matrix based on a first fixed block size.

14. The processing unit of claim 13, wherein the decomposition circuitry is to decompose the first matrix by:
selecting a first subset of the first plurality of blocks based on a corresponding number of zero-value elements of each of the first plurality of blocks.

15. The processing unit of claim 14, wherein selecting the first subset comprises selecting a block having the most zero-value elements of the first plurality of blocks.

16. The processing unit of claim 14, wherein the decomposition circuitry is to decompose the first matrix by:
prior to selecting the first subset, filtering the first plurality of blocks based on a fill threshold indicating a specified number of zero-value elements for a block.

17. The processing unit of claim 14, wherein the decomposition circuitry is to decompose the first matrix by:
including the first subset in the third matrix.

18. The processing unit of claim 17, wherein the decomposition circuitry is to decompose the first matrix by:
determining if a sparseness ratio of non-zero value elements to zero-value elements of the third matrix meets a threshold, the threshold based a compute ratio between the processing unit and the PIM device; and
in response to the sparseness ratio being below the threshold, extracting a second plurality of blocks from the first matrix based on a second fixed block size, the second fixed block size different from the first fixed block size.

19. A processing system, comprising:
a processor-in-memory (PIM) device; and
a processing unit configured to, in response to receiving a matrix arithmetic command:
decompose at a processing unit a first matrix into a second matrix and a third matrix, the second matrix being denser than the third matrix;
send the third matrix to the processor-in-memory (PIM) device for execution of a first arithmetic operation; and
responsive to the second matrix being denser than the third matrix, assign the second matrix for execution of a second arithmetic operation by the processing unit.

20. The processing system of claim 19, wherein the processing unit comprises:
an arithmetic logic unit configured to execute the second arithmetic operation at the processing unit based on the second matrix.

* * * * *